United States Patent
Myeong et al.

(10) Patent No.: US 7,235,224 B2
(45) Date of Patent: Jun. 26, 2007

(54) PROCESS FOR PREPARING FINE METAL OXIDE PARTICLES

(75) Inventors: Wan-Jae Myeong, Daejeon (KR); Jin-Soo Baik, Daejeon (KR); Se-Woong Park, Daejeon (KR); Chang-Mo Chung, Daejeon (KR); Kyu-Ho Song, Daejeon (KR)

(73) Assignee: Han-Wha Chemical Corporation, Seoul (KR)

( * ) Notice: Subject to any disclaimer, the term of this patent is extended or adjusted under 35 U.S.C. 154(b) by 240 days.

(21) Appl. No.: 10/521,642

(22) PCT Filed: Jul. 8, 2003

(86) PCT No.: PCT/KR03/01354

§ 371 (c)(1),
(2), (4) Date: Jan. 12, 2005

(87) PCT Pub. No.: WO2004/007350

PCT Pub. Date: Jan. 22, 2004

(65) Prior Publication Data

US 2006/0182677 A1    Aug. 17, 2006

(30) Foreign Application Priority Data

Jul. 15, 2002  (KR) .................. 10-2002-0041376

(51) Int. Cl.
*C01G 1/00* (2006.01)

(52) U.S. Cl. .................. 423/592.1; 423/263; 423/622; 423/594.19; 423/604; 423/632; 423/608; 423/635; 423/639; 423/605; 423/631; 423/625; 977/773; 977/775; 977/811

(58) Field of Classification Search .......... 423/263, 423/592.1, 622, 594.19, 604, 632, 631, 625, 423/608, 635, 639, 605; 977/773, 775, 811
See application file for complete search history.

(56) References Cited

U.S. PATENT DOCUMENTS

| 5,039,452 | A | * | 8/1991 | Thompson et al. ..... 252/519.51 |
| 5,433,878 | A | | 7/1995 | Arai et al. ................ 252/62.63 |
| 5,480,630 | A | | 1/1996 | Arai et al. .................. 423/625 |
| 5,635,154 | A | | 6/1997 | Arai et al. .................. 423/592 |

FOREIGN PATENT DOCUMENTS

| JP | 1-219166 A | * | 9/1989 |
| JP | 8-169715 A | * | 7/1996 |
| JP | 9-52772 A | * | 2/1997 |
| JP | 198449 | | 7/2001 |
| JP | 2001-350274 A | * | 12/2001 |
| WO | WO 87/04421 | | 7/1987 |

OTHER PUBLICATIONS

Philip C. Dell'Orco et al. "Reactions of Nitrate Salts with Ammonia in Supercritical Water" Ind. Eng. Chem. Res., vol. 36, No. 7, pp. 2547-2557, (1997).*

* cited by examiner

*Primary Examiner*—Timothy C. Vanoy
(74) *Attorney, Agent, or Firm*—Abelman, Frayne & Schwab

(57) ABSTRACT

Disclosed is a process for preparing fine metal oxide particles, comprising the following steps of reacting a reactant mixture comprising i) water, ii) at least one water-soluble metal nitrate and iii) ammonia or ammonium salt at 250–700° C. under 180–550 bar for 0.01 sec to 10 min in a reaction zone to synthesize the metal oxide particles, the metal nitrate being contained at an amount of 0.01–20 wt % in the reactant mixture; and separating and recovering the metal oxide particles from the resulting reaction products. According to the present invention, nano-sized metal oxide particles are synthesized, while the harmful by-products generated concurrently therewith are effectively decomposed in the same reactor.

12 Claims, No Drawings

PROCESS FOR PREPARING FINE METAL OXIDE PARTICLES

TECHNICAL FIELD

The present invention relates to a process for preparing fine metal oxide particles. More specifically, the present invention is directed to a process for preparing fine metal oxide particles under supercritical or near supercritical water conditions, while decomposing harmful by-products generated concurrently therewith in the same reactor.

BACKGROUND ART

Generally, fine particles are defined to have a size smaller than 100 nm. Metal oxide particles having such a size have been widely used in the polishing fields including wafer-polishing CMP (Chemical Mechanical Polishing) slurry, cosmetics/medicine fields including UV protective cream, chemical reaction catalyst fields, and other fields including coating, magnetic devices, electronic devices and optical devices. In the future, the fine metal oxide particles will be expected to act as an important factor for next-generation nano-technologies, environmental/energy technologies, bio-technologies, etc.

Examples of the preparation methods of the fine metal oxide particles include a gas phase method, a liquid phase method and a solid phase method, according to the reaction phase.

The gas phase method comprises the steps of vaporization of a metal or metal precursor followed by a reaction of the vaporized metal or metal precursor with oxygen. In such a case, according to the types of the vaporization and the reaction, the gas phase method is classified into flame combustion pyrolysis, laser vaporization, plasma vaporization, spray pyrolysis, etc. The gas phase method is advantageous in terms of the simplicity, and the uniformity and fineness of particles, but suffers from high energy consumption, an expensive device and low productivity, thus negating economic benefits.

Further, the solid phase method is exemplified by a firing and a mechnochemical synthesis. In particular, the firing method is regarded as a typical preparation of inorganic particles, in which a precursor is subjected to pyrolysis for a long time in a furnace maintained at a high temperature, and then oxidized, to produce a metal oxide, which is then crystallized for another long time and pulverized to fine particles. The firing method involves the simple preparation processes, but is disadvantageous in terms of easy incorporation of impurities, and the reaction at high temperatures for long periods. Meanwhile, the mechanochemical synthesis method is characterized in that the surface of the metal precursor is activated by mechanical impetus of high energy and high speed. However, this method has disadvantages, such as the incorporation of impurities caused by abrasion of balls and a vial during a milling process, the extended reaction time and the requirement of a calcining process.

In addition, the liquid phase method includes hydrothermal synthesis, sol-gel method, micro-emulsion method and the like. As for the micro-emulsion method, a mixture of surfactant and metal precursor is reacted in a micelle so that the resulting product is precipitated, whereby it is possible to produce the particles having uniform sizes. However, the micelle serving as a reactor has a low concentration, and thus wastes may be generated in larger amounts. As well, the productivity is low, and also there are other disadvantages, such as the use of expensive surfactants and the use of the calcining process. Also, the sol-gel method is mainly used for the preparation of $TiO_2$, by which uniform and fine particles can be prepared. But, it is difficult to realize mass production. In the hydrothermal synthesis widely used as the liquid phase method, water is used as a reaction medium or a reactant. As such, the employed temperature and pressure are not too high. However, the produced particles have a large particle size and a wide particle size distribution. In particular, when the raw materials are nitrates, sulfates and hydrochlorides, waste acids are generated as in the other liquid phase methods.

As a kind of the hydrothermal synthesis, a supercritical hydrothermal synthesis method is reviewed in Ind. Eng. Chem. Res. Vol. 39, 4901–4907 (2000) by Ajiri et. al, Japan. According to the above method, a water-soluble metal salt is reacted under supercritical water conditions (temperature $\geq$ 374° C., pressure $\geq$ 221.2 bar), to easily produce nano-sized particles. However, also the supercritical hydrothermal synthesis method suffers from the production of a waste acid as represented by the following Reaction 1:

Reaction 1

Wherein, M denotes a metal.

As for the supercritical hydrothermal synthesis process, a batch-type and a continuous-type are disclosed in WO 87/04421 and U.S. Pat. No. 5,635,154, respectively. In the batch-type, the reaction is performed for relatively longer periods, i.e., tens of minutes, and thus it is difficult to control the particle size, and a wide particle size distribution is obtained. Whereas, the continuous-type reaction is performed within a short time of 0.1 second to a few minutes, whereby there is no calcining process and the resulting product is very pure. In addition, it is easy to control the crystallization and the crystal size.

In U.S. Pat. Nos. 5,433,878, 5,480,630 and 5,635,154, there is disclosed a method of producing fine metal oxide particles by decomposition-reacting a metal salt at 200° C. or higher under 250–500 $kg/cm^2$ for 1–10 min by use of a continuous tube reactor. However, the above method still has drawbacks, including the production of waste acids such as nitric acid and hydrochloric acid.

At present, the amount of by-product, inter alia harmful nitrogen-containing compounds (e.g., nitric acid), generated from the above preparation process have been strictly restricted based on environmental laws. Accordingly, a treatment for converting the harmful nitrogen-containing compound is additionally required. In these situations, research on techniques of treating the produced nitrogen compounds has been vigorously performed.

In this regard, Japanese Patent Laid-open Publication No. 2001-197449 discloses that a nitrogen-containing compound and an oxidizing agent are subjected to a hydrothermal reaction under supercritical or subcritical conditions, and a catalyst-inhibiting material is removed from the reactant, after which the generated ammonia or $N_2O$ is decomposed in the presence of a specific catalyst. Further, in Ind. Eng. Chem. Res. Vol. 37, pp. 2547–2557 (1997), there is disclosed the decomposition of nitrate and ammonia under supercritical water conditions of a temperature of about 450–530° C. and a pressure of about 300 bar. In addition, the oxidation of nitrogen-containing wastewater under supercritical water conditions results in generating the nitrogenation reaction between the ammonium ion and the nitrate ion, which is reported in J. Korean Ind. Eng. Chem. Vol. 11, No.

4, pp. 432–438. Also, with the intention of decomposing the generated nitrogen compounds, various methods, such as biological decomposition or catalyst decomposition, are proposed. However, techniques for preparing the fine metal oxide particles and for treating the harmful nitrogen-containing compounds produced concurrently with the synthesis of the fine metal oxide particles in the same reactor have not yet been developed.

DISCLOSURE OF THE INVENTION

Leading to the present invention, the intensive and thorough research into the removal of harmful nitrogen-containing compounds produced at the same time as fine metal oxide particles are synthesized, carried out by the present inventors aiming at solving problems encountered in the related art, resulted in the finding that a reactant comprising i) water, ii) at least one water-soluble metal nitrate and iii) ammonia or ammonium salt is continuously reacted under supercritical (or near supercritical) water conditions, to synthesize the nano-sized fine metal oxide particles, while the nitrogen compounds generated as a by-product of the above reaction, e.g., nitric acid, are effectively decomposed in the same reactor.

In particular, the present inventors have found that the noxious nitrogen-containing compounds concurrently produced as by-products may be effectively converted into the harmless ones even under the milder conditions than the prior arts in the present process.

Therefore, it is an object of the present invention to provide a method of preparing fine metal oxide particles, in which nano-sized metal oxide particles are synthesized, while the harmful by-products generated concurrently therewith are effectively decomposed in the same reactor, whereby the amount of the harmful nitrogen-containing compounds to be discharged after the synthesizing process can be drastically decreased, thus achieving superior quality, environmental friendliness and economic benefits.

In order to accomplish the above object, there is provided a process for preparing fine metal oxide particles, comprising the steps of:

a) reacting a reactant mixture comprising i) water, ii) at least one water-soluble metal nitrate and iii) ammonia or ammonium salt at a reaction temperature of 250–700° C. under a reaction pressure of 180–550 bar for 0.01 sec to 10 min in a reaction zone to synthesize the metal oxide particles, the metal nitrate being contained at an amount of 0.01–20 wt % in the reactant mixture; and b) separating and recovering the metal oxide particles from the resulting reaction products.

In the above process, the toxic nitrogen-containing compounds produced concurrently with the synthesis of the metal oxide particles are converted into non-toxic nitrogen-containing compounds during the step a) in the same reaction zone.

BEST MODE FOR CARRYING OUT THE INVENTION

Based on the present invention, a preparation method of fine metal oxide particles is provided by reacting water, at least one water-soluble metal nitrate, and ammonia or ammonium salt under supercritical (or near supercritical) water conditions in a reactor, preferably continuous reactor, to synthesize fine particles having a particle size of 1–1000 nm. In addition of the synthesis of the metal oxide particles, toxic nitrogen-containing compounds (such as nitric acid) produced as the by-product thereof can be converted in the same reactor or reaction zone, thereby drastically decreasing the amount of the toxic nitrogen-containing compounds to be discharged after the synthesizing process.

In accordance with the present invention, a metal employable for the metal oxide synthesis is not particularly limited so long as it is water-soluble, and is selected from the group consisting of the Groups IA, IB, IIA, IIB, IIIA, IIIB, IVA, IVB, VA, VB, VIIA, VIIB, VIIB, VIII elements, lanthanides, actinides, or combinations thereof.

Specifically, such a metal is exemplified by cerium, zinc, cobalt, nickel, copper, iron, aluminum, titanium, barium, and manganese.

Preferably, the metal nitrate is used in the aqueous form thereof. As such, the aqueous metal nitrate solution is not limited in concentrations thereof. However, the metal salt in the total reactant has a concentration of 0.01–20 wt %, and preferably 0.05–10 wt %. If the concentration is lower than 0.01 wt %, the productivity becomes lowered due to the concentration being too dilute. On the other hand, if the concentration is higher than 20 wt %, a synthetic solution has very high viscosity and thus fluidity thereof becomes low, thus lowering the quality.

According to the present invention, the ammonia or ammonium salt serves to convert the toxic nitrogen-containing compounds, which are generated concurrently with the synthesis of the metal oxide particles, into the harmless ones. As such, the preferable form thereof is an ammonia gas, an aqueous ammonia solution, or an aqueous solution of ammonium salt, such as ammonium carbamate. The ammonia or ammonium salt is used in a molar ratio of 0.5–3.0, and preferably 0.8–2.0, relative to the nitric acid to be converted stoichiometrically from the used metal nitrate by the metal oxide synthesis reaction. When such a molar ratio is less than 0.5, the conversion of the harmful nitrogen-containing compound becomes insufficient. Meanwhile, the molar ratio exceeding 3.0 results in too large amounts of ammonia or ammonium salt contained in the effluent solution.

According to the present invention, the reaction is performed under supercritical (or near supercritical) water conditions of 250° C. or higher and 180 bar or more, preferably 250–700° C. and 180–550 bar, and more preferably, 300–550° C. and 200–400 bar. If the reaction is performed at the temperature lower than 250° C. under the pressure less than 180 bar, the synthesized particles have a large particle size, and as well, the nitrogen-containing compound by-product is insufficiently decomposed. Meanwhile, too-high temperature and pressure lead to re-dissolution of the fine metal oxide particles, thus negating economic benefits. As a time required for the complete mixing of the used reactants is shorter, the resulting particle size becomes further uniform. Therefore, a mixer is designed to have a desired particle size distribution. Further, the reaction temperature and reaction pressure as well as the feeding rate, feeding position and concentration of the reactant fluids should be properly controlled.

As for the reactor useful in the present invention, since both the synthesis of the metal oxide particles and the conversion of the toxic nitrogen-containing compound are performed within a short time, a continuous reactor capable of shortening the reaction time is preferably used, rather than a batch-type or semi-batch-type requiring a long reaction time. In particular, a tube-type reactor is most preferable. The reaction time falls in the range of 0.01 sec to 10 min, and preferably 0.1 sec to 2 min.

It is of interest that the conversion of the toxic nitrogen-containing compound may be carried out effectively (up to approximately 96%) under the milder condition (400° C. or less) than the prior arts as mentioned above. It is believed that such an unexpected result is due to the produced metal oxide particles present in the reaction zone.

Taking into consideration that the reaction time is relatively short, and the mixing of the used reactants should be conducted within short time for uniform particle size distribution, it is preferred that the respective reactants are subjected to specific step such as pressurizing, heating and pressurizing/heating in advance for facilitating the achievement of the reaction condition required upon reaction.

In accordance one embodiment of the present invention, the useful reactants comprise water (e.g., deionized water), one or more aqueous metal nitrate solution, and a fluid containing ammonia or ammonium salt (such as ammonia gas, aqueous ammonia solution, aqueous ammonium salt solution).

The water may be previously heated at a predetermined temperature and pressurized under a predetermined pressure so as to facilitate the provision of the pressure and temperature required for causing the synthetic reaction of the fine metal oxide particles upon mixing with the aqueous metal nitrate solution and the fluid containing ammonia or ammonium salt.

The mixing of the reactants may be carried out in the multi-step as well as in the single step. For example, the heated and pressurized water may be firstly mixed with the fluid containing ammonia or ammonium salt, and then mixed with at least one aqueous metal nitrate solution. Alternatively, the water may be firstly mixed with at least one aqueous metal nitrate solution, and then mixed with the fluid containing ammonia or ammonium salt.

The aqueous metal nitrate solution may be subjected to pressurizing or pressurizing/heating prior to the mixing. In this case, the pressure is determined depending on the required reaction pressure (e.g., 180 bar or more) with preference. While, the temperature depends on the kinds of metal nitrate. In this regard, a heating process may not be performed, or is performed at the temperature not causing the hydrolysis of metal nitrate, even though being performed. If the hydrolysis of metal nitrate occurs before the reaction, the sol or gel is produced depending on the kind of the metals used, thus increasing the viscosity. Thereby, the operation of the reactor becomes difficult, and the synthesized particles are larger. Additionally, when metal oxide particles composed of a plurality of metals are desirable, other aqueous metal nitrate solutions needful for synthesis of such metal oxide particles are subjected to pressurizing or pressurizing/heating separately or together, and then mixed.

The fluid containing ammonia or ammonium salt may be also subjected to pressurizing or pressurizing/heating prior to the mixing.

In accordance another embodiment of the present invention, without separately using water, an aqueous ammonia solution or an aqueous ammonium salt solution may be heated at a predetermined temperature and pressurized under a predetermined pressure, and then mixed with the aqueous one or more metal nitrate solution.

Further, in order to control the sizes, shapes, physical properties of the synthesized particles, and the synthesizing speed, an alkali solution, such as potassium hydroxide, or an acidic solution, such as sulfuric acid, may be added to the reactant mixture before or during the metal oxide particles synthesis. Preferably, the alkali or acid in the added solution amounts to a molar ratio of 0.1–20 relative to the metal nitrate. Furthermore, a reducing agent, for example, hydrogen, or an oxidizing agent, for example, oxygen or hydrogen peroxide, may be added to the reactant mixture before or during the metal oxide particles synthesis. Preferably, the added reducing agent or oxidizing agent amounts to a molar ratio of 0.1–20 relative to the metal nitrate.

With the aim of properly using the synthesized fine metal oxide particles, slurry of the metal oxide particles is cooled, after which the metal oxide particles are concentrated and separated from the slurry, and then dried and recovered. The cooling process is performed using a heat exchanger, etc. The concentration and separating process is exemplified by centrifugation, filtration and so on, and the drying process includes oven drying, freeze drying, spray drying and the like. The slurry may be directly sprayed under high temperature and high pressure, thereby simultaneously performing the separating process and the drying process. As necessary, a washing process may be further added. Thusly synthesized fine metal oxide particles are composed of a single metal oxide, a plurality of metal oxides or other metal compound-doped metal oxides, capable being synthesized from a single metal nitrate or a plurality of metal nitrates including any metal selected from among the Groups IA, IB, IIA, IIB, IIIA, IIIB, IVA, IVB, VA, VB, VIA, VIB, VIIB, VIII elements, and lanthanides, actinides, or combinations thereof. Such a metal oxide is exemplified by cerium oxide ($CeO_2$), zinc oxide (ZnO), barium titanate ($BaTiO_3$), ferric oxide ($Fe_2O_3$), cuprous oxide (CuO), cobalt oxide ($Co_3O_4$), nickel oxide (NiO), manganese oxide ($Mn_2O_3$), boehmite (AlOOH), barium hexaferrite ($BaO.6Fe_2O_3$), lithium cobalt oxide, lithium manganese oxide, lithium nickel oxide, etc.

The fine metal oxide particles have a particle size of 1–1000 nm, and preferably 5–500 nm. If the particle size is smaller than 1 nm, it is difficult to handle such oxide particles and also the aggregation of the particles occurs excessively, thus increasing a primary or secondary particle size. Meanwhile, if the size exceeds 1000 nm, characteristics as the fine particles are considerably lowered.

Having generally described this invention, a further understanding can be obtained by reference to specific examples which are provided herein for purposes of illustration only and are not intended to be limiting unless otherwise specified.

EXAMPLE 1

Deionized water was pumped at 60 g/min using a ¼ inch-diameter tube, and then heated at a temperature of 510° C. and pressurized under a pressure of 300 bar. 2.8 wt % aqueous cerium nitrate solution ($Ce(NO_3)_3.6H_2O$) was pumped at a flow rate of 5 g/min through a ¼ inch-diameter tube, and pressurized to 300 bar. An aqueous solution of ammonia having a molar ratio of about 0.9 relative to the nitric acid to be converted stoichiometrically from the cerium nitrate by the subsequent cerium nitrate-decomposing reaction was pumped at a flow rate of 5 g/min through a ¼ inch-diameter tube, and pressurized to 300 bar. The aqueous cerium nitrate solution, the aqueous solution of ammonia and the heated deionized water, each of which was in the state of being pressurized, were mixed, and then reacted at 425° C. for 7.2 sec. The resulting slurry was cooled, after which a centrifuging process and a drying process were performed, thereby separating the produced particles from the slurry. The particles were analyzed with XRD and SEM, and thus confirmed to be octahedral cerium oxide crystals with an average diameter of 40 nm. An effluent solution from which the particles were separated was analyzed with IC (Ion Chromatograph). As a result, the concentration of $NO_3^-$ in the effluent solution was found to be 180 ppm, and $NO_2^-$ to be 2.2 ppm, and $NH_4^+$ to be 15 ppm. Hence, it can be confirmed that about 79% of the nitrate ions (857 ppm) to be produced stoichiometrically from the cerium nitrate were decomposed, and about 93% of the ammonium ions (211 ppm) contained in the used aqueous solution of ammonia were decomposed.

EXAMPLE 2

The present example was performed in the same manner as in Example 1, except that the molar ratio of ammonia in the aqueous solution of ammonia to nitric acid to be converted stoichiometrically from the cerium nitrate was 1.1. The resulting slurry was cooled, after which a centrifuging process and a drying process were performed, thereby separating the produced particles from the slurry. The particles were analyzed with XRD and SEM, and thus confirmed to be octahedral cerium oxide crystals with an average diameter of 40 nm. Further, an effluent solution from which the particles were separated was found to have 50 ppm $NO_3^-$, 20 ppm $NO_2^-$ and 35 ppm $NH_4^+$, by the IC analysis. Hence, it can be confirmed that about 92% of the nitrate ions to be produced stoichiometrically from the cerium nitrate were decomposed, and about 86% of the ammonium ions contained in the used aqueous solution of ammonia were decomposed.

EXAMPLE 3

The present example was performed in the same manner as in Example 1, except that the molar ratio of ammonia in the aqueous solution of ammonia to nitric acid to be converted stoichiometrically from the cerium nitrate was 1.5. The resulting slurry was cooled, after which a centrifuging process and a drying process were performed, thereby separating the produced particles from the slurry. The particles were analyzed with XRD and SEM, and thus confirmed to be octahedral cerium oxide crystals with an average diameter of 40 nm. Further, an effluent solution from which the particles were separated was analyzed with IC, and was found to have 72 ppm $NO_3^-$, 15 ppm $NO_2^-$ and 40 ppm $NH_4^+$. Accordingly, it can be confirmed that about 90% of the nitrate ions to be produced stoichiometrically from the cerium nitrate were decomposed, and about 89% of the ammonium ions contained in the used aqueous solution of ammonia were decomposed.

COMPARATIVE EXAMPLE 1

The present example was performed in the same manner as in Example 1, except that the aqueous solution of ammonia was not used, and the aqueous cerium nitrate solution was pumped at a flow rate of 10 g/min. The resulting slurry was cooled, after which a centrifuging process and a drying process were performed, thereby separating the produced particles from the slurry. The particles were analyzed with XRD and SEM, and thus confirmed to be octahedral cerium oxide crystals with an average diameter of 40 nm. Further, an effluent solution from which the particles were separated was was analyzed with IC, and was found to have 1700 ppm $NO_3^-$. In the light of the above, it can be recognized that the by-product nitrate ions were hardly decomposed.

EXAMPLES 4–19

Deionized water was pumped at a flow rate of 80 g/min through a ¼ inch-diameter tube, heated and pressurized. An aqueous cerium nitrate solution was pumped at a flow rate of 4 g/min and at room temperature through a ¼ inch-diameter tube, and pressurized. An aqueous solution of ammonia having a molar ratio of 1.1 to nitric acid to be converted stoichiometrically from the cerium nitrate was pumped through a ¼ inch-diameter tube, and pressurized. The aqueous cerium nitrate solution, the aqueous solution of ammonia and the heated deionized water, each of which was in the state of being pressurized, were mixed, and then reacted at predetermined temperatures. While temperatures, pressures, cerium nitrate concentrations, and reactor volumes after a final mixing were changed, the reaction was carried out for 1–20 sec. The resulting slurry was cooled, after which a centrifuging process and a drying process were performed, thereby separating the produced particles from the slurry. The particles were analyzed with XRD and SEM. The solution from which the particles were separated was analyzed for the concentrations of $NO_3^-$ and $NO_2^-$ with IC. The results are shown in Table 1, below. From the Table 1, it can be seen that the produced cerium oxide has a particle size (average XRD) of 33.13–64.55 nm. As well, the decomposition ratio ((added amount-discharged amount)/added amount×100) falls in the range of 66.7–96.3 wt %, although slightly varying depending on the conditions.

TABLE 1

| Ex. No. | Temp. (°C.) | Pressure (bar) | Conc. (wt %) | Reactor (cm³) | Particle Size (nm) | Nitrate (ppm) | Nitrite (ppm) | Decomp. (%) |
|---|---|---|---|---|---|---|---|---|
| 4 | 425 | 300 | 1.5 | 4.4 | 46.88 | 338.9 | 8.9 | 94.6 |
| 5 | 385 | 300 | 1.5 | 4.4 | 64.55 | 1410.0 | 3.6 | 78.0 |
| 6 | 385 | 230 | 1.5 | 4.4 | 58.77 | 658.7 | 0.0 | 89.7 |
| 7 | 425 | 230 | 1.5 | 4.4 | 44.05 | 1010.0 | 9.5 | 84.1 |
| 8 | 425 | 300 | 0.5 | 4.4 | 43.20 | 274.6 | 4.1 | 87.0 |
| 9 | 385 | 300 | 0.5 | 4.4 | 59.33 | 712.0 | 1.4 | 66.7 |
| 10 | 385 | 230 | 0.5 | 4.4 | 39.57 | 570.4 | 2.4 | 73.3 |
| 11 | 425 | 230 | 0.5 | 4.4 | 35.95 | 340.2 | 5.7 | 83.9 |
| 12 | 385 | 300 | 0.5 | 62.74 | 53.96 | 451.9 | 0.0 | 78.9 |
| 13 | 425 | 300 | 0.5 | 62.74 | 50.20 | 31.8 | 47.4 | 96.3 |
| 14 | 385 | 230 | 0.5 | 62.74 | 33.13 | 302.3 | 2.3 | 85.8 |
| 15 | 425 | 230 | 0.5 | 62.74 | 57.83 | 126.7 | 69.6 | 90.8 |
| 16 | 385 | 300 | 1.5 | 62.74 | 63.29 | 1658.7 | 6.6 | 74.1 |
| 17 | 385 | 230 | 1.5 | 62.74 | 59.62 | 1134.2 | 3.7 | 82.3 |
| 18 | 425 | 230 | 1.5 | 62.74 | 34.30 | 319.8 | 18.8 | 94.7 |
| 19 | 425 | 300 | 1.5 | 62.74 | 53.64 | 784.4 | 19.5 | 87.5 |

EXAMPLE 20

An aqueous zinc nitrate solution ($Zn(NO_3)_2 \cdot 6H_2O$) was pumped at a flow rate of 5 g/min and at room temperature through a ¼ inch-diameter tube, and pressurized. An aqueous ammonia solution was pumped at a flow rate of 60 g/min through a ¼ inch-diameter tube, heated and pressurized, and then mixed with the pressurized zinc nitrate. Thereafter, the mixed solution was controlled to be at a temperature of 400° C. under a pressure of 300 bar. The concentrations of $Zn(NO_3)_2$ and ammonia in the mixed solution were 0.05M and 0.11M, respectively. The volume of the reactor was controlled to perform the reaction for 30 sec. The resulting slurry was cooled, after which a centrifuging process and a drying process were performed, thereby separating the produced particles from the slurry. The particles were analyzed with XRD and SEM. As a result, the produced ZnO was confirmed to have short rod-shaped crystals each having an average length of 80 nm. Also, an effluent solution from which the particles were separated was analyzed for the concentrations of $NO_3^-$ and $NO_2^-$ with IC. As a result, the concentrations of $NO_3^-$ and $NO_2^-$ were found to be 351 ppm and 21 ppm, respectively. Therefore, it can be confirmed that 94.9% of the by-product nitric acid was decomposed.

EXAMPLE 21

An aqueous cobalt nitrate solution ($Co(NO_3)_3 \cdot 6H_2O$) was pumped at a flow rate of 5 g/min and at room temperature through a ¼ inch-diameter tube, and pressurized. an aqueous lithium hydroxide solution ($LiOH \cdot H_2O$) was pumped at a flow rate of 5 g/min and at room temperature through a ¼ inch-diameter tube and pressurized. The above aqueous solutions were firstly mixed, to which the heated and pressurized deionized water was added at 60 g/min in such a manner that the temperature and pressure in the reactor reached 400° C. and 300 bar, respectively. As such, with the intention of effective oxidation, the deionized water was previously mixed with hydrogen peroxide, heated and pressurized, and then used. Thereafter, an aqueous ammonia solution was pumped at a flow rate of 5 g/min through a ¼ inch-diameter tube, and pressurized, whereby a second mixing process of the firstly mixed solutions was conducted. After the final mixing, the concentrations were found to be 0.4 M LiOH, 0.01 M $Co(NO_3)_3$, 0.07 M hydrogen peroxide and 0.033 M ammonia. The volume of the reactor was controlled to perform the reaction for 1 min. The resulting slurry was cooled, after which a centrifuging process and a drying process were performed, thereby separating the produced particles from the slurry. The particles were analyzed with XRD and SEM. As a result, the produced $LiCoO_2$ was confirmed to have octagonal plate-shaped crystals having an average diameter of 55 nm. The solution from which the particles were separated was analyzed for the concentrations of $NO_3$ and $NO_2^-$ with IC. $NO_3^-$ and $NO_2^-$ were found to be 72 ppm and 18 ppm, respectively. Therefore, it can be confirmed that 95.2% of nitric acid as a by-product was decomposed.

EXAMPLE 22

Mixed aqueous solutions of ferric nitrate ($Fe(NO_3)_3$) and barium nitrate ($Ba(NO_3)_2$) were pumped at a flow rate of 5 g/min and at room temperature through a ¼ inch-diameter tube, and pressurized. An aqueous potassium hydroxide solution was pumped at a flow rate of 5 g/min and at room temperature through a ¼ inch-diameter tube, and pressurized. Deionized water was heated and pressurized, and pumped at a flow rate of 30 g/min using a ¼ inch-diameter tube, and then further heated and pressurized. The three types of pressurized fluids were firstly mixed. Thereafter, the temperature and flow rate of the deionized water were controlled so that the firstly mixed solution was maintained at 200° C. under 300 bar. Then, a heated and pressurized aqueous solution of ammonia was pumped and introduced at a flow rate of 30 g/min, and then a second mixing process was carried out. After the final mixing, the temperature and pressure in the reactor was 400° C. and 300 bar, respectively. In such a case, the concentrations of each component of the finally mixed reaction were found to be 0.02 M ferric nitrate, 0.04 M barium nitrate, 0.56 M potassium hydroxide and 0.154 M ammonia. The volume of the reactor was controlled so that the reactor had a residence time of 1 min. The resulting slurry was cooled, after which a centrifuging process and a drying process were performed, thereby separating the produced particles from the slurry. The particles were analyzed with XRD and SEM. As a result, the produced particles were confirmed to be barium hexaferrite ($BaO \cdot 6Fe_2O_3$) as thin hexagonal plate-shaped crystals having an average diameter of 160 nm. An effluent solution from which the particles were separated was analyzed for the concentrations of $NO_3^-$ and $NO_2^-$ with IC. $NO_3^-$ and $NO_2^-$ were found to be 367 ppm and 56 ppm, respectively. Hence, it can be confirmed that 95.1% of the by-product nitric acid was decomposed.

INDUSTRIAL APPLICABILITY

As described above, the present invention provides a preparation method of fine metal oxide particles, which is advantageous in terms of synthesis of nano-sized fine metal oxides and efficient removal of nitrogen compounds in the same reactor by reacting a reactant mixture comprising i) water, ii) at least one water-soluble metal nitrate and iii) ammonia or ammonium salt under supercritical or near supercritical water conditions. This process is preferably carried out in the continuous reactor such as a continuous tube reactor. Thereby, environmental contamination can be prevented and lowered preparation costs can be exploited.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

The invention claimed is:

1. A process for preparing fine metal oxide particles, comprising the following steps:
   a) reacting a reactant mixture comprising i) water, ii) at least one water-soluble metal nitrate and iii) ammonia or ammonium salt at a reaction temperature of 250 to 700° C. under a reaction pressure of 180 to 550 bar for 0.01 sec to 10 mm in a reaction zone to synthesize the metal oxide particles, the metal nitrate being contained at an amount of 0.01–20 wt % in the reactant mixture; and
   b) separating and recovering the metal oxide particles from the resulting reaction products, wherein the ammonia or ammonium salt is contained in the reactant mixture at a molar ratio of 0.5 to 3.0 relative to nitric acid produced from the metal nitrate by the metal oxide synthesis.

2. The process as defined in claim 1, wherein the step a) is carried out by a continuous reactor.

3. The process as defined in claim 2, wherein the continuous reactor is a tube-type reactor.

4. The process as defined in claim 1, wherein the step a) comprises:
providing water subjected to pressurizing and heating;
providing an aqueous solution of the metal nitrate subjected to pressurizing or pressurizing/heating;
providing a fluid containing ammonia or ammonium salt subjected to pressurizing or pressurizing/heating; and
mixing the heated and pressurized water with the aqueous solution of the metal nitrate and the fluid containing ammonia or ammonium salt in a single step or multiple step, followed by reacting the resulting mixture,
wherein, the resulting mixture has a temperature of 250–700° C. and a pressure of 180–550 bar.

5. The process as defined in claim 1, wherein the step a) comprises:
providing an aqueous solution of the metal nitrate subjected to pressurizing and heating;
providing an aqueous ammonia solution or an aqueous ammonium salt solution subjected to pressurizing or pressurizing/heating; and
mixing the aqueous solution of the metal nitrate and the aqueous ammonia solution or an aqueous ammonium salt solution, followed by reacting the resulting mixture,
wherein, the resulting mixture has a temperature of 250–700° C. and a pressure of 180–550 bar.

6. The process as defined in claim 1, wherein the reaction temperature is in the range of 250–550° C.

7. The process as defined in claim 1, wherein the reaction pressure is in the range of 180–400 bar.

8. The process as defined in claim 1, wherein a metal of the water-soluble metal nitrate is selected from the group consisting of cerium, zinc, cobalt, nickel, copper, iron, aluminum, titanium, barium and manganese.

9. The process as defined in claim 1, wherein the ammonia or ammonium salt is in the form of ammonia gas, an aqueous ammonia solution or an aqueous solution of ammonium salt.

10. The process as defined in claim 4, wherein the fluid containing ammonia or ammonium salt is in the form of ammonia gas, an aqueous ammonia solution or an aqueous solution of ammonium salt.

11. The process as defined in claim 1, wherein the fine metal oxide particles have a particle size of 1–1000 nm.

12. The process as defined in any one of claims 1–10 and 11, further comprising adding an alkali or acidic solution, and/or a reducing agent or oxidizing agent, to the reactant mixture before or during the metal oxide particles synthesis.

* * * * *